(12) United States Patent
Ll

(10) Patent No.: US 8,528,465 B2
(45) Date of Patent: Sep. 10, 2013

(54) COFFEE MACHINE

(76) Inventor: Hang Ll, Yongkang (CN)

( * ) Notice: Subject to any disclaimer, the term of this patent is extended or adjusted under 35 U.S.C. 154(b) by 672 days.

(21) Appl. No.: 11/795,684

(22) PCT Filed: Apr. 3, 2007

(86) PCT No.: PCT/CN2007/001086
§ 371 (c)(1),
(2), (4) Date: Apr. 19, 2010

(87) PCT Pub. No.: WO2007/112694
PCT Pub. Date: Oct. 11, 2007

(65) Prior Publication Data
US 2010/0199847 A1    Aug. 12, 2010

(30) Foreign Application Priority Data

Apr. 3, 2006  (CN) .......................... 2006 1 0050204
May 23, 2006  (CN) .......................... 2006 1 0085107
Dec. 27, 2006  (CN) ...................... 2006 2 0141800 U

(51) Int. Cl.
*A47J 31/40*    (2006.01)

(52) U.S. Cl.
USPC ............................................. 99/283; 99/286

(58) Field of Classification Search
USPC ............... 99/286, 283, 288, 289 R, 300, 290, 99/295, 304, 305, 306, 307, 302 R, 279; 241/101.2, 65
See application file for complete search history.

(56) References Cited

U.S. PATENT DOCUMENTS

| | | | | |
|---|---|---|---|---|
| 2,629,663 A | * | 2/1953 | Fogler et al. | 426/432 |
| 5,267,507 A | * | 12/1993 | Enomoto | 99/286 |
| 5,615,601 A | * | 4/1997 | Eugstar | 99/280 |

FOREIGN PATENT DOCUMENTS

CN    2209573    4/2002

* cited by examiner

*Primary Examiner* — Henry Yuen
*Assistant Examiner* — Phuong Nguyen
(74) *Attorney, Agent, or Firm* — Baker & Hostetler LLP

(57) ABSTRACT

A coffee machine, including a grinder, a stewing vessel, and a water supply mechanism, is disclosed. The stewing vessel is connected to the water supply mechanism and is positioned below a discharging outlet of the grinder. A filter mesh is provided in the stewing vessel, which is fixed on the casing body of the coffee machine. A bean chamber is provided in the grinder, and under the bean chamber is provided a grinding unit, the grinding unit including a bean grinding chamber in which a rotating grinding plate and a stationary grinding plate are provided. The shaft of the grinding motor is connected to the rotating grinding plate, and a removable shaft coupling is provided between the shaft of the grinding motor and the rotating grinding plate.

14 Claims, 10 Drawing Sheets

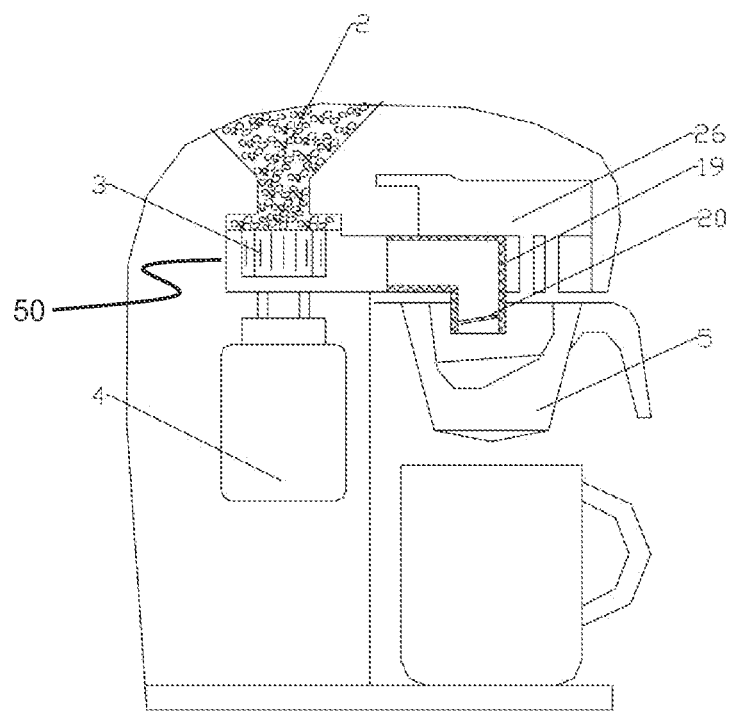
Figure 9
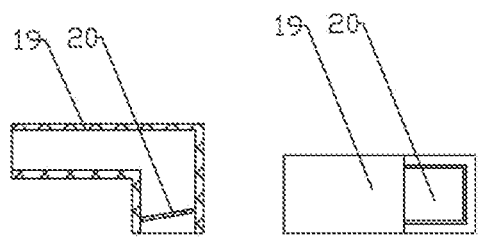
Figure 10   Figure 11
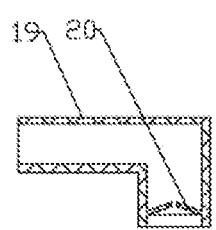 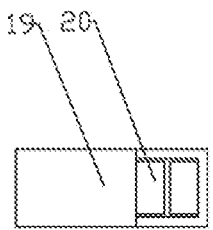
Figure 12   Figure 13

COFFEE MACHINE

CROSS-REFERENCE TO RELATED APPLICATIONS

This application is the National Stage of International Application No. PCT/CN2007/001086 filed Apr. 3, 2007, which claims the benefit of Chinese Application Nos. 200610050204.1 filed Apr. 3, 2006; 200610085107.6 filed May 23, 2006; and 200620141800.6 filed Dec. 27, 2006, the entire disclosure of which is incorporated herein by reference.

TECHNICAL FIELD

The present invention relates to a coffee machine, particularly to a coffee machine comprising a removable grinder and a removable stewing vessel.

BACKGROUND ART

The present coffee machines are mainly classified into two types: one type is the automatic stewing coffee machine which combines the grinding and stewing into one unit; the other is the separate type coffee machine with separated grinder and brewer. For example, Chinese patent No. 02209573.X disclosed an "automatic stewing device of coffee machine" which consists of a bean grinder, a filter, a driving mechanism and a water supply mechanism. However, the above automatic stewing coffee machine has the following disadvantages:

1. After stewing coffee, the coffee grounds remains in the filter cylinder of the filter. For stewing the coffee automatically and continuously, a mechanism for automatically removing the coffee grounds should be provided. Thus the automatically stewing coffee machine has a very complex structure and the manufacture cost is very high.

2. Since the stewing vessel is nonremovable, the cleaning of the stewing vessel is very inconvenient. When the users change the coffee of different flavors, flavor tainting occurs. And, inconvenience of the cleaning can also causes the health problem.

3. When the coffee machine is used to stewing coffee, a large amount of water vapor enters the coffee powder outlet channel and the grinder to moisten the coffee powder be, thereby affecting the use of coffee machine.

4. The coffee powder amount controlling mechanism in the coffee machine has a complex structure, and the manufacture cost is high.

5. The stewing water amount controlling mechanism in the coffee machine is complex, and the manufacture cost is high.

6. Since the grinder in the coffee machine is nonremovable, it is difficult to clear the remained coffee powder in the grinder. When different kinds of coffee beans are processed in the coffee machine, it is easy to cause flavor tainting of the coffee powders, so that the above coffee machine with the nonremovable grinder can not be used in a situation that users are frequently changed or by a coffee enthusiast.

7. The present grinder only uses one grinding motor. When the grinding motor stops, the coffee powder in the powder outlet channel can not be discharged, so that the coffee powder in the above grinder can not be discharged completely.

Furthermore, in use of the present coffee machine with separated grinder and brewer, the coffee beans are ground into coffee powder in the grinder, and then the coffee powder is put into the brewer to be stewed. So for this coffee machine, the ground coffee powder needs to be put into the brewer manually, it is inconvenient in use.

DISCLOSURE OF THE INVENTION

To eliminate the disadvantages of the prior art, the object of the invention is to provide a coffee machine which has a simple structure, is convenient for cleaning, reliable in working, and has a low manufacture cost, and which is suitable for the places where users frequently change.

To attain the above object, the technical solution of the present invention is as following: a coffee machine comprises a grinder, a stewing vessel and a water supply mechanism, the said stewing vessel is connected to the water supply mechanism; the stewing vessel is positioned below a discharging outlet of the grinder, a filter mesh is provided in the stewing vessel, and the stewing vessel is fixed on the coffee machine through a removable structure. Since the stewing vessel is fixed on the casing body of the coffee machine through a removable structure, the stewing vessel may be taken off to spill out coffee grounds after the coffee is stewed. The coffee grounds is spilt out manually so that the structure of the coffee machine can be much simplified and the manufacture cost is low. In the present invention, both the grinder and stewing vessel are set in the coffee machine, after the coffee beans are put into the coffee machine, the processes of bean grinding and stewing can be completed by operating the control switches. Compared with the coffee machine with the separate grinder and brewer, the step of transmitting manually the coffee power from the grinder to the brewer is omitted, so it is relatively convenient in use. Since the stewing vessel is fixed on the coffee machine through a removable structure, it can be washed when being released from the coffee machine, so flavor tainting can be avoided when different kinds of coffee beans are changed for the coffee machine, and it is more healthy in use.

In the present invention, the said grinder is preferably an electrical grinder In which the grinding plate is driven by a grinding motor. Of course, the grinder may be a hand-driving grinder In which the grinding plate is driven through a handle. As long as the grinder is provided in the coffee machine and the ground coffee powder can be introduced into the stewing vessel conveniently, the object of the invention can be attained.

In the present invention, the stewing vessel can be connected to the casing body of the coffee machine with various removable modes. The said stewing vessel may be inserting connected to the casing body of the coffee machine; or the stewing vessel may be screwed connected to the casing body of the coffee machine; or the stewing vessel may be hanging connected to the casing body of the coffee machine. Any removable connecting structure which may be disassembled and assembled conveniently can be used between the stewing vessel and the coffee machine.

In the present invention, the said water supply mechanism comprises a water tank for the coffee machine, a heating vessel, a water outlet pipe connected between the water tank and the heating vessel, a water outlet pipe connected between the heating vessel and the stewing vessel. The water supply mechanism with the above configuration has a simple structure and is convenient to manufacture. The heating vessel may also be a minitype boiler.

The said heating vessel may be single or multiple tubular heating vessel, it also may adopt a minitype boiler.

In the present invention, a discharging door is provided at the discharging outlet of the said grinder. The discharging door can prevent the coffee powder from spraying out when grinding coffee bean. Meanwhile, the discharging door can block a large amount of water vapor from entering the coffee powder outlet channel and the grinder, thereby prevent the coffee powder from being moistened.

In the present invention, the said discharging door may be a rubber door with at least a valve. Because the rubber door itself has a certain elasticity, when the coffee powder is ground, the airflow generated by the grinder can press the rubber door to automatically open it. After completion of the grinding, the rubber door closed the discharging outlet under the action of self elasticity to prevent a large amount of water vapor from entering the coffee powder outlet channel and the grinder in stewing. The rubber door of the present invention may be a rubber door with one valve; of course, it also may be a rubber door with two or more valves. The discharging door of rubber door has a very simple structure.

In the present invention, the lower end of said rubber door may extends into or not extend into the stewing vessel. When the lower end of the rubber door extends into the stewing vessel, drawing out and inserting the stewing vessel can shake the rubber door to scatter a little amount of coffee powder sticking on the side of the rubber door so that, when the grinder works, the rubber door can conveniently release the coffee powder. When the lower end of the rubber door does not extend into the stewing vessel, the releasing of the coffee powder from the rubber door can be carried out by selecting the valve of rubber door with suitable elasticity and controlling the airflow produced by the grinder.

In the present invention, the said discharging door may be a plugin type electromagnetic valve or an overturning type electromagnetic valve. The discharging door is opened and closed with the electromagnetic valve, has a good sealing performance. Both the plugin type electromagnetic valve or overturning type electromagnetic valve have the good function of preventing water vapor from entering the grinder and the coffee powder outlet channel.

In the present invention, a powder amount controlling mechanism is provided in the said coffee machine, and a time regulator is provided in the power amount controlling mechanism to control the working of the motor. A brewing water amount controlling mechanism is provided in the water supply mechanism, and a time regulator is provided in the water amount controlling mechanism to control the working of the heating vessel. The powder amount controlling mechanism and the water amount controlling mechanism may cooperate with each other. Of course, they may be adjusted according to the users' requirements. The powder amount is controlled by adjusting the working time of the motor with the time regulator, this configuration has a very simple structure. Also, the water amount is controlled by adjusting the working time of the heating vessel with the time regulator, this configuration has a very simple structure.

Preferably in the present invention, a check valve is provided between the said water tank and the water outlet pipe. The heating vessel is a tubular heating vessel connected to a stewing chamber. The stewing chamber is positioned above the stewing vessel and is provided with steam recovering tubes connected to the water tank. The application of tubular heating vessel is convenient for controlling the brewing water amount by controlling the heating time.

In the present invention, a timer is provided in the said coffee machine so that the coffee machine can perform the coffee stewing operation timely according to the user's need. For example, if a time is set, the coffee machine can automatically stew the required coffee.

A bean chamber is provided in the grinder, and under the bean chamber is a grinding unit. A grinding bean chamber containing grinding plates therein is provided in the grinding unit. The said grinding plates include a rotating grinding plate and a stationary grinding plate. Both the two grinding plates have grinding teeth. The shaft of grinding motor is coupled to the rotating grinding plate. A powder outlet is formed in the grinding bean chamber, and a powder outlet channel is provided under the powder outlet. A removable shaft coupling is provided between the shaft of the grinding motor and the rotating grinding plate.

Since the removable shaft coupling is provided between the shaft of the grinding motor and the rotating grinding plate, the bean chamber and the grinding unit can be disassembled together from the coffee machine, and it is very convenient for clearing the remained coffee powder in the grinder. In use, the bean chamber and the grinding unit are positioned into the coffee machine together, then the shaft coupling joins the shaft of the grinding motor and the rotating grinding plate so that the grinding motor can drive the rotating grinding plate to grind coffee bean. When different kind of coffee bean or different users need to be changed for the coffee machine, flavor tainting of coffee power can be avoided by changing the grinder of the coffee machine, and it is more healthy in use. So the coffee machine is very suitable for the places where the users frequently change and for a coffee enthusiast. Of course, when different kinds of coffee beans or different users need to be changed for the coffee machine, the original grinder also may be used after being cleaned.

The said grinder comprises a grinding unit setting seat into which the grinding unit is inserted. So it is convenient to change the bean chamber and the grinding unit.

A screw rod is provided in the powder outlet channel and connected to a powder delivering motor on its end away from the powder outlet. With the powder delivering motor, when the grinding motor is stopped, the powder delivering motor is controlled to work for a further time, the coffee powder in the powder outlet channel can be removed more clearly, and the coffee remainder in the coffee machine can be reduced.

The said bean chamber and the stationary grinding plate are fixed on a support for the stationary grinding plate, and the support for the stationary grinding plate is rotatablely connected to the grinding unit. With the above structure, the bean chamber and the stationary grinding plate can be conveniently removed from the grinding unit so that the grinding bean chamber can be conveniently cleaned.

The rotating grinding plate is fixed on a support for the grinding plate. With the above structure, the power transmission is more reliable.

DESCRIPTION OF THE DRAWINGS

FIG. 9 is a schematic view showing the rubber door of the discharging outlet of the invention.

FIG. 10 is a section schematic view of the first type of rubber door of the invention.

FIG. 11 is a bottom view of the first type of rubber door of the invention.

FIG. 12 is a section schematic view of the second type of the rubber door of the invention.

FIG. 13 is a bottom view of the second type of rubber door of the invention.

BEST MODE OF THE INVENTION

Figure 1:
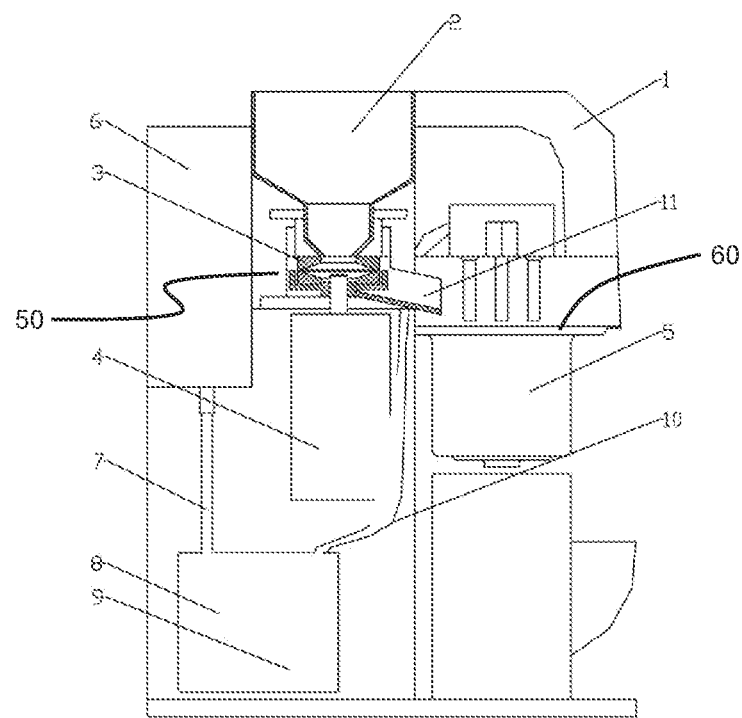
FIG. 1 is a schematic view of the structure of example 1 of the invention.

Hereinafter, the present invention will be described in detail with reference to the accompanying drawings and specific examples, but they should not be construed as limitations to the present invention.

EXAMPLE 1

In the coffee machine of present example as shown in FIG. 1, FIG. 2, FIG. 5 and FIG. 6, a bean chamber 2 is provided in the casing body 1 of the coffee machine. The grinding plate 3 of the grinder 50 is driven by a grinding motor 4. The stewing vessel 5 is connected to a water supply mechanism. The water supply mechanism comprises a water tank 6 of coffee machine, a water outlet pipe 7 is connected to a heating vessel 8, and the water outlet pipe 10 of the heating vessel 9 is communicated with the stewing vessel 5. The stewing vessel 5 is positioned under the discharging outlet 11 of the grinder 50. A filter mesh 12 is provided in the stewing vessel 5. The stewing vessel 5 is fixed on the casing body 1 of the coffee machine through a removable structure 60.

Figure 2:
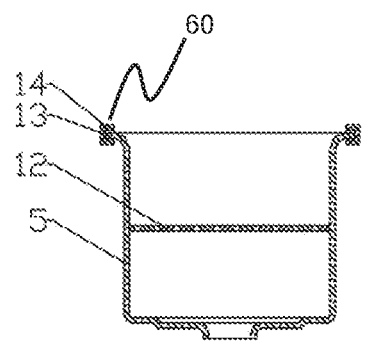
FIG. 2 is a schematic view showing the assembly structure of the stewing vessel in example 1 of the invention.

As shown in FIG. 2, inserting dowels 13 are provided at the upper edge of the stewing vessel 5 and inserting slots 14 corresponding to the inserting dowels 13 are provided on the casing body 1 of coffee machine. The above removable structure 60 is convenient for disassembling or assembling the stewing vessel 5 with the coffee machine.

Since the stewing vessel 5 of the present invention is fixed to the casing body 1 of coffee machine through a removable structure 60, it has a simple structure, is convenient to be cleaned and has a low manufacture cost. The processes of grinding bean and stewing can be completed by just operating the control switches, so it is convenient to use.

EXAMPLE 2

Figure 7:
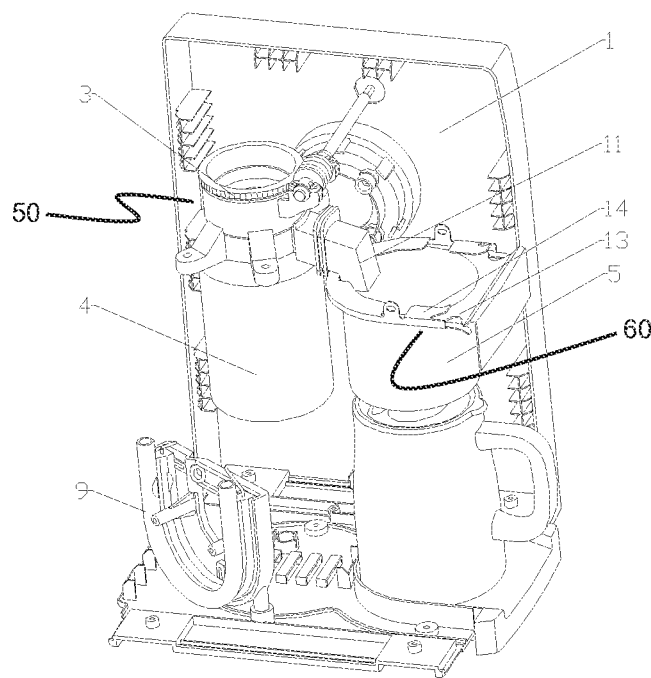
FIG. 7 is a schematic view of the structure of example 2 of the invention.
Figure 19:
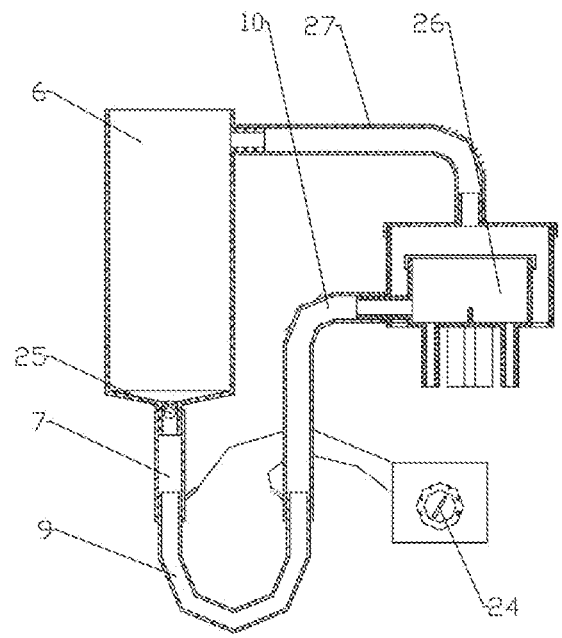
FIG. 19 is a schematic view showing the stewing water amount controlling mechanism of the invention.

As shown in FIG. 7, in the present example, a bean chamber 2 is provided in the casing body 1 of coffee machine. The grinding plate 3 of the grinder 50 is driven by a grinding motor 4. The stewing vessel 5 is connected to a water supply mechanism. The heating vessel 9 is a tubular heating vessel. The stewing vessel 5 is positioned under the discharging outlet 11 of the grinder 50. Inserting dowels 13 are provided at the upper edge of the stewing vessel 5 and inserting slots 14 are provided on the coffee machine. As shown in FIG. 19, a check valve 25 is provided between the water tank 6 and the water outlet pipe 7. The tubular heating vessel 9 is connected to the stewing chamber 26. The stewing vessel is under the stewing chamber 26. Steam recovering tubes 27 are provided on the stewing chamber 26 and connected to the water tank.

Figure 3:
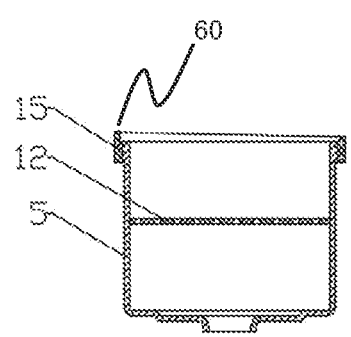
FIG. 3 is a schematic view showing the assembly structure of the stewing vessel in example 2 of the invention.

Or as shown in FIG. 3, screw threads 15 are provided on the upper edge of the stewing vessel 5 and on the coffee machine for matching with each other, and the stewing vessel 5 may be conveniently disassembled from or assembled to the coffee machine by rotating the stewing vessel 5.

EXAMPLE 3

Figure 8:
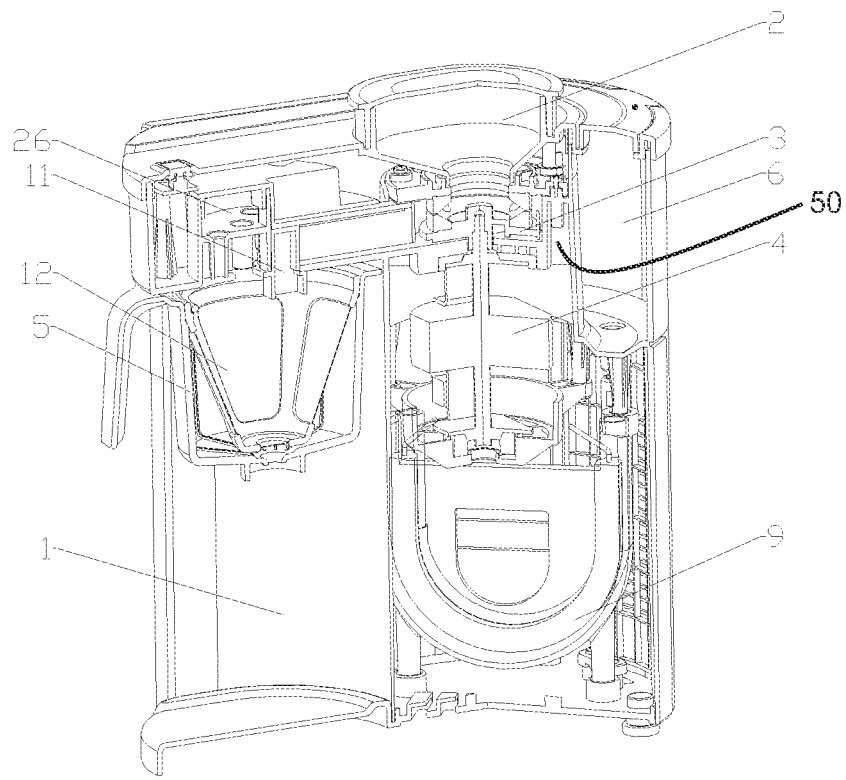
FIG. 8 is a schematic view of the structure of example 3 of the invention.

As shown in FIG. 8, in the present example, a bean chamber 2 is provided in the casing body 1 of coffee machine. The grinding plate 3 of the grinder 50 is driven by a grinding motor 4. The stewing vessel 5 is connected with the water supply mechanism. The water tank 6 of the coffee machine is connected with the tubular heating vessel 9. A filter mesh 12 is provided in the stewing vessel 5. The stewing vessel 5 is fixed on the coffee machine by an inserting connection structure. As further shown in FIG. 19, a check valve 25 is provided between the water tank 6 and the water outlet pipe 7 in the present invention. The tubular heating vessel 9 is connected with the stewing chamber 26. The stewing vessel 5 is provided under the stewing chamber 26. Steam recovering tubes 27 are provided on the stewing chamber 26 and connected to the water tank 6.

Figure 4:
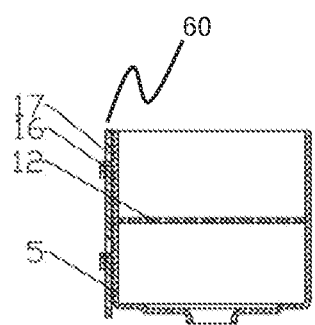
FIG. 4 is a schematic view showing the assembly structure of the stewing vessel in example 3 of the invention.
Figure 5:
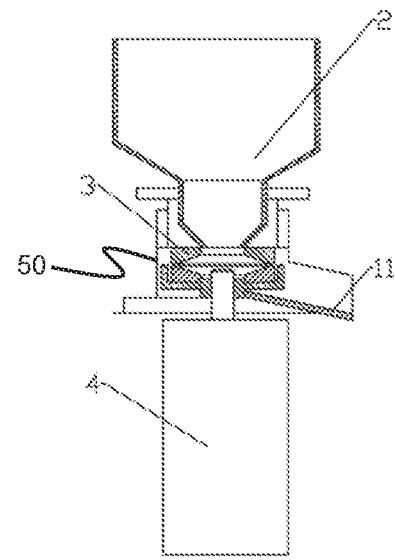
FIG. 5 is a schematic view showing the structure of the grinder in example 1 of the invention.
Figure 6:
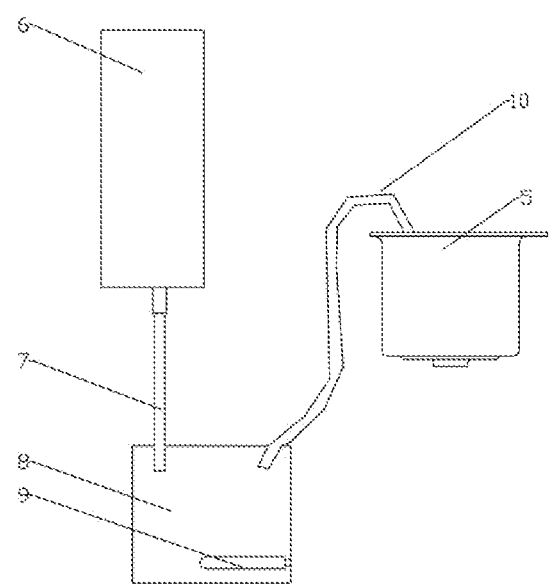
FIG. 6 is a schematic view showing the stewing vessel and the water supply mechanism of example 1 of the invention.

As shown in FIG. 4, hooks 16 are provided on the stewing vessel 5, and hanging holes 17 matching with the hooks 16 are provided on the casing body 1 of coffee machine. The coupling of the hooks 16 and the hanging holes 17 also can disassemble or assemble the stewing vessel 5 with the coffee machine.

As shown in FIG. 9, a discharging door is provided at the discharging outlet 11 of the grinder 50 in the present invention. The discharging door is a rubber door 19. Since the rubber door 19 has a certain elasticity, when the coffee powder is ground, the airflow produced by the grinder 50 may press the rubber door to automatically open it. When the grinding is finished, the rubber door closes the discharging outlet 11 under the action of its elasticity to prevent a large amount of water vapor from entering the grinder 50 and the coffee powder outlet channel along the channel in stewing. The lower end of rubber door may extend into or not extend into the stewing vessel 5 in the present invention.

As shown in FIG. 10 and FIG. 11, the discharging door of the present invention is a rubber door 19 with a valve 20. The rubber door may show a shape of "☐", of course it can show a shape of straight tube.

As shown in FIG. 12 and FIG. 13, the discharging door of the present invention may adopt a rubber door 19 with two valves 20.

Figures 14, 15:
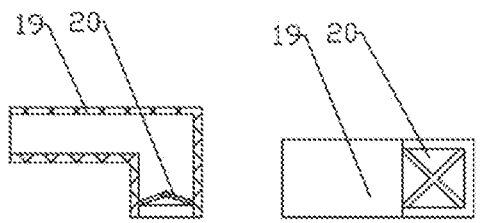
FIG. 14 is a section schematic view of the third type of the rubber door of the invention.
FIG. 15 is a bottom view of the third type of rubber door of the invention.

As shown in FIG. 14 and FIG. 15, the discharging door of the present invention may adopt a rubber door 19 with four valves 20.

The discharging door of the present invention can prevent the coffee powder from spraying out when grinding the coffee powder. Meanwhile, the discharging door can prevent a large amount of water vapor from entering the coffee powder outlet channel and the grinder.

Figure 16:
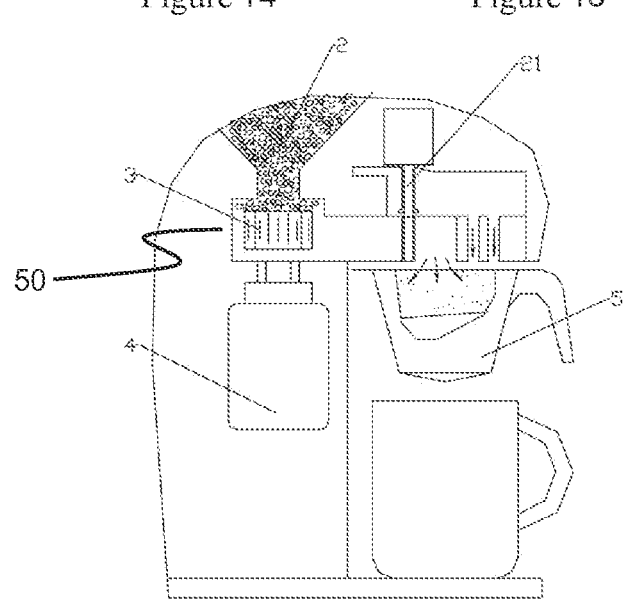
FIG. 16 is a schematic view showing the discharging door of the invention which adopts a plugin type electromagnetic valve.
Figure 17:
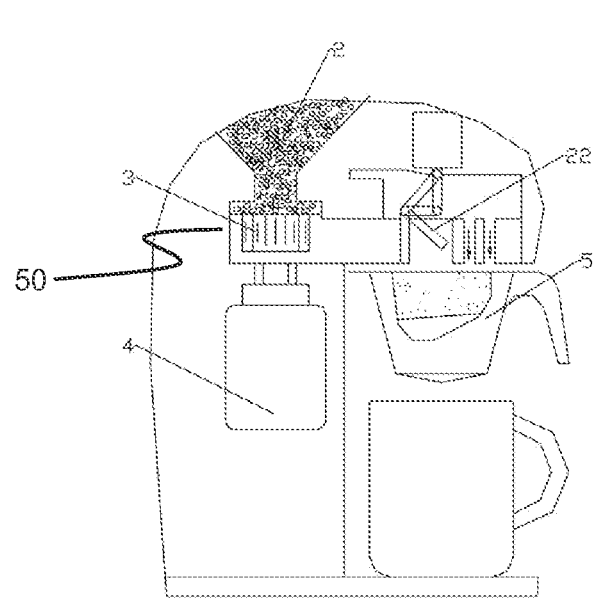
FIG. 17 is a schematic view showing the discharging door of the invention which adopts a overturning type electromagnetic valve.

As shown in FIG. 16, the discharging door of the present invention may adopt a plugin type electromagnetic valve 21. The discharging outlet is opened and closed with an electromagnetic valve, which has good sealing performance. Of course, a overturning type electromagnetic valve 22 as shown in FIG. 17 may also be used in the present invention. Both the plugin type electromagnetic valve and the overturning type electromagnetic valve have good function of preventing the water vapor from entering the grinder and the coffee powder outlet channel.

Figure 18:
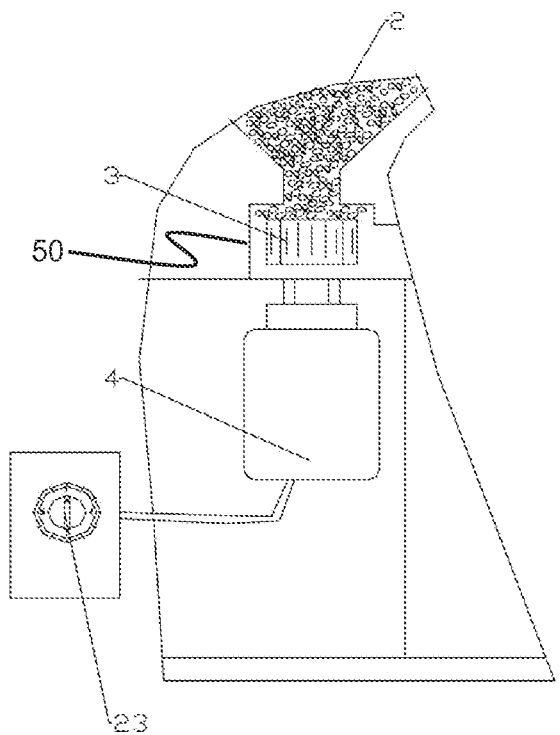
FIG. 18 is a schematic view showing the coffee powder amount controlling mechanism of the invention.

As shown in FIG. 18, a coffee powder amount controlling mechanism is provided in the coffee machine of the present invention, and a working time regulator 23 for controlling the working time of the motor is provided in the powder amount controlling mechanism.

As shown in FIG. 19, a brewing water amount controlling mechanism is provided in the water supply mechanism of the present invention, and a working time regulator 24 for controlling the working time of the heating vessel 9 is provided in the brewing water amount controlling mechanism. A check valve 25 is provided between the water tank 6 and the water outlet pipe 7 in the present invention. The tubular heating vessel 9 is connected with the stewing chamber 26. A stewing vessel 5 is provided under the stewing chamber 26. Steam recovering tubes 27 are provided on the stewing chamber 26 and connected to the water tank 6. With the tubular heating vessel, it is convenient for controlling the brewing water amount.

Figure 20:
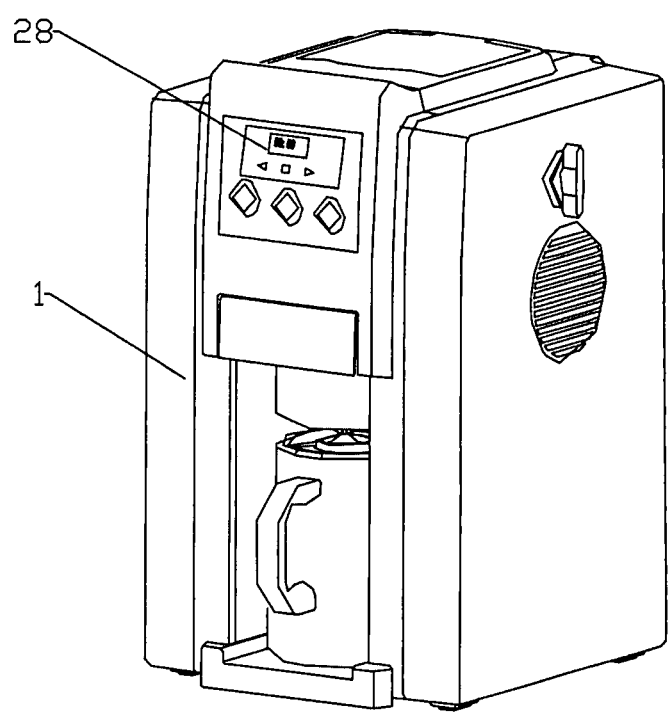
FIG. 20 is a schematic view showing the outline and the timer of the coffee machine according to the invention.

As shown in FIG. 20, in the present invention, a timer 28 is provided in the coffee machine so that it can complete the operation of stewing coffee according to the user's need.

Figure 21:
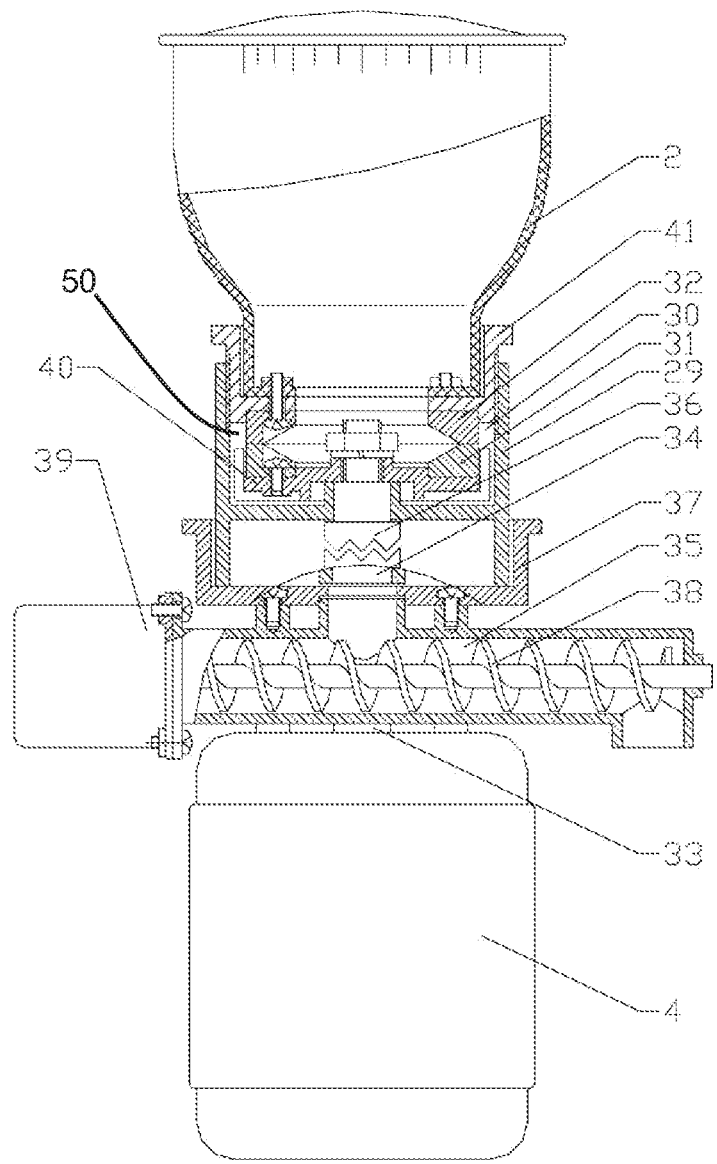
FIG. 21 is a section schematic view showing the grinder of the coffee machine of the invention.
Figure 22:
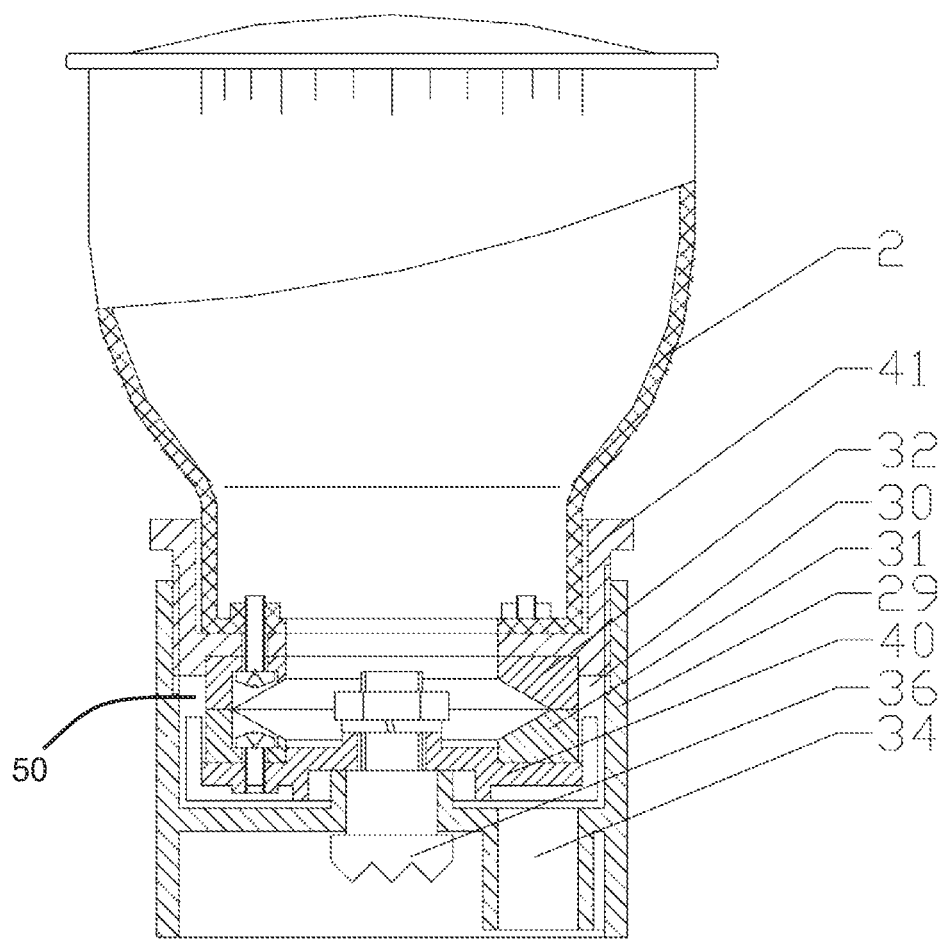
FIG. 22 is a section schematic view showing the portion of two grinding plates of the present invention, in which the viewing section turns by 90° with respect to the FIG. 1.
Figure 23:
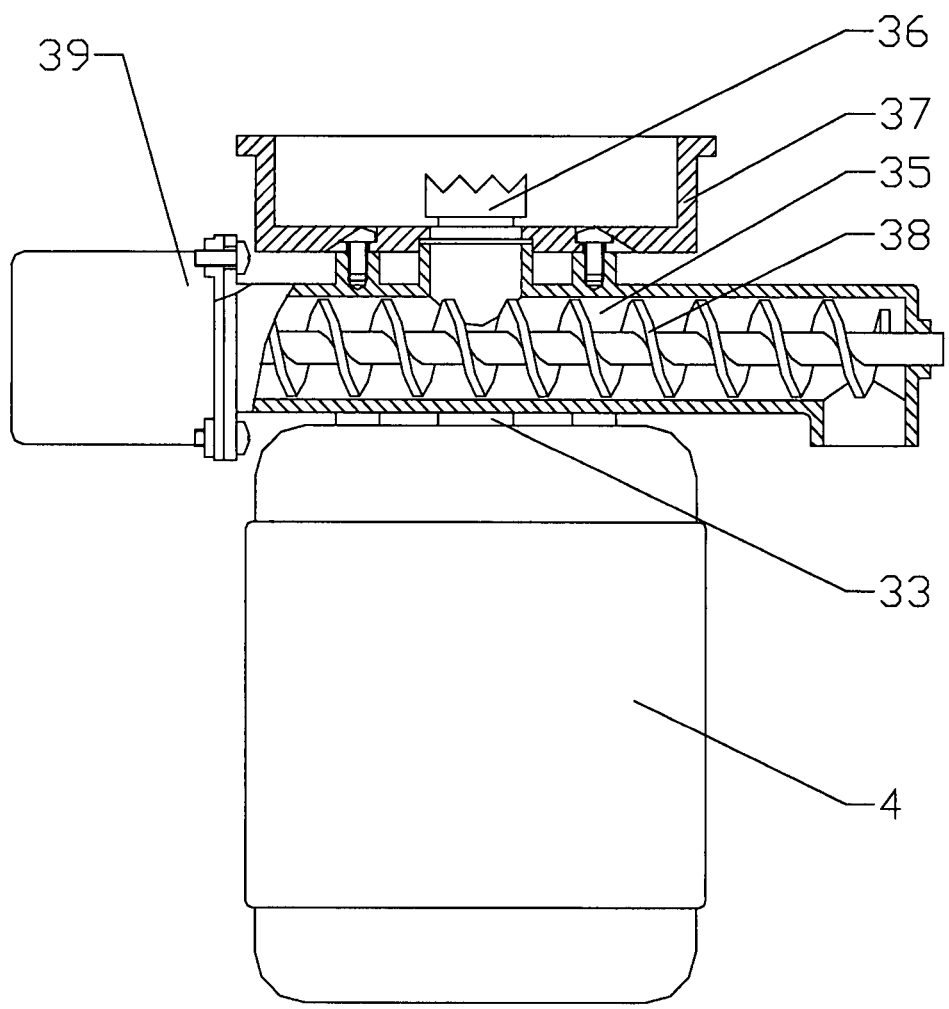
FIG. 23 is a schematic view showing the power mechanism and the powder outlet channel in the grinder of the present invention.

As shown in FIG. 21, FIG. 22 and FIG. 23, a bean chamber 2 is provided in the grinder, and a grinding unit 29 is provided under the bean chamber 2. A grinding bean chamber 30 is provided in the grinding unit 29. A rotating grinding plate 31 and a stationary grinding plate 32 are provided in the grinding bean chamber 30. Both of grinding plates are provided with grinding teeth. The shaft 33 of grinding motor 4 is connected to the rotating grinding plate 31. A powder outlet 34 is provided in the grinding bean chamber 30. A powder outlet channel 35 is provided under the powder outlet 34. A removable shaft coupling 36 is provided between the shaft 33 of the grinding motor 4 and the rotating grinding plate 31.

A grinding unit setting seat 37 is provided for the grinder, the grinding unit 29 is inserted in the grinding unit setting seat 37. A screw rod 38 is provided in the power outlet channel 35. A powder delivering motor 39 is connected with the screw rod 38. The rotating grinding plate 31 is fixed on a support for rotating grinding plate 40. The bean chamber 2 and the stationary grinding plate 32 are fixed on a support for stationary grinding plate 41, and the support for stationary grinding plate 41 is rotatablely connected to the grinding unit 29. With the above structure, the bean chamber 2 and the stationary grinding plate 32 can be conveniently removed from the grinding unit 29, so that the grinding bean chamber 30 can be cleaned easily.

Since a removable shaft coupling 36 is provided between the shaft 33 of the grinding motor 4 and the rotating grinding plate 31, the bean chamber 2 and the grinding unit 29 can be removed together from the coffee machine, so that it is convenient for clearing the remained coffee powder in the grinder. When different kinds of coffee bean need to be changed for the coffee machine, flavor tainting of coffee power can be avoided by changing the grinder of the coffee machine. So the coffee machine is suitable for the places where the users frequently change. With the powder delivering motor 39, when the grinding motor 4 is stopped, the powder delivering motor 39 is controlled to work for a further time, the coffee powder remainder in the coffee machine can be reduced.

The above examples are only some individual cases of the present invention, and any modification according to the spirit of the invention should not be understood as departing from the protective scope of the present invention.

The invention claimed is:

1. A coffee machine, comprising:
   a grinder including:
      a bean chamber, and
      a grinding unit disposed under the bean chamber;
   a stewing vessel positioned below a discharging outlet of the grinder, the stewing vessel being fixed on a casing body of the coffee machine through a removable structure;
   a filter mesh disposed in the stewing vessel;
   a water supply mechanism connected to the stewing vessel, the water supply mechanism including a stewing water amount controlling mechanism, the stewing water amount controlling mechanism including a time regulator to control a working time of the heating vessel; and
   a coffee powder amount controlling mechanism including a time regulator to control a working time of a coffee powder delivering motor,
   wherein the coffee powder amount controlling mechanism and the water amount controlling mechanism cooperate with each other,
   wherein the grinding unit includes:
      a grinding bean chamber, and
      a rotating grinding plate and a stationary grinding plate disposed in the grinding bean chamber,
   wherein the grinder is an electric grinder, and the rotating grinding plate of the grinder is driven by a grinding motor, wherein the rotating and stationary grinding plates include grinding teeth, a shaft of the grinding motor being coupled with the rotating grinding plate,
   wherein the grinding bean chamber has a powder outlet, and a powder outlet channel is disposed under the powder outlet, and
   wherein a screw rod is disposed in the powder outlet channel, and an end of the screw rod that is located away from the powder outlet is connected to the powder delivering motor.

2. The coffee machine according to claim 1, wherein the stewing vessel is connected to the casing body of the coffee machine by a structure selected from the group consisting of an inserting connection, a screwed connection, and a hanging connection.

3. The coffee machine according to claim 1, wherein the water supply mechanism includes:
   a water tank for the coffee machine,
   a heating vessel,
   a first water outlet pipe connected between the water tank and the heating vessel, and
   a second water outlet pipe connected between the heating vessel and the stewing vessel.

4. The coffee machine according to claim 3, further comprising a check valve disposed between the water tank and the first water outlet pipe, wherein
the heating vessel is a single or multiple tubular heating vessel, which is connected to a stewing chamber through the second water outlet pipe, and
the stewing chamber is positioned above the stewing vessel and includes steam recovering tubes connected to the water tank.

5. The coffee machine according to claim 1, wherein the heating vessel is a minitype boiler.

6. The coffee machine according to claim 1, wherein a discharging door is disposed at the discharging outlet of the grinder.

7. The coffee machine according to claim 6, wherein the discharging door is a rubber door with at least one valve.

8. The coffee machine according to claim 6, wherein the discharging door is a plugin type electromagnetic valve or an overturning type electromagnetic valve.

9. The coffee machine according to claim 1, further comprising a timer.

10. The coffee machine according to claim 1, wherein a removable shaft coupling is disposed between the shaft of the grinding motor and the rotating grinding plate.

11. The coffee machine according to claim 1, wherein the grinder further includes a grinding unit setting seat into which the grinding unit is inserted.

12. The coffee machine according to claim 1, wherein
the bean chamber and the stationary grinding plate are fixed on a support for the stationary grinding plate, and
the support for the stationary grinding plate is rotatably connected to the grinding unit.

13. The coffee machine according to claim 1, wherein the rotating grinding plate is fixed on a support for the rotating grinding plate.

14. The coffee machine according to claim 1, wherein the stewing vessel is connected to the casing body of the coffee machine by either a screwed connection or a hanging connection.

* * * * *

UNITED STATES PATENT AND TRADEMARK OFFICE
CERTIFICATE OF CORRECTION

PATENT NO. : 8,528,465 B2  Page 1 of 1
APPLICATION NO. : 11/795684
DATED : September 10, 2013
INVENTOR(S) : Hang Ll It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1289 days.

Signed and Sealed this

Fifteenth Day of September, 2015

Michelle K. Lee
*Director of the United States Patent and Trademark Office*